(12) United States Patent
Takada

(10) Patent No.: US 7,431,509 B2
(45) Date of Patent: Oct. 7, 2008

(54) BEARING WITH ROTATION SENSOR AND METHOD OF INCORPORATING THE SAME TO ROTATING OBJECT

(75) Inventor: Seiichi Takada, Kuwana (JP)

(73) Assignee: NTN Corporation, Osaka-shi (JP)

( * ) Notice: Subject to any disclaimer, the term of this patent is extended or adjusted under 35 U.S.C. 154(b) by 397 days.

(21) Appl. No.: 11/282,825

(22) Filed: Nov. 18, 2005

(65) Prior Publication Data

US 2006/0110085 A1      May 25, 2006

(30) Foreign Application Priority Data

Nov. 19, 2004    (JP) .............................. 2004-335704

(51) Int. Cl.
*F16C 32/00*    (2006.01)
(52) U.S. Cl. ........................ 384/448; 384/541
(58) Field of Classification Search ................. 384/448, 384/541; 324/207.25, 173, 174

See application file for complete search history.

(56) References Cited

U.S. PATENT DOCUMENTS

| 5,063,346 A * | 11/1991 | Hogan et al. ................. 324/173 |
| 6,098,263 A * | 8/2000 | Subler et al. ................. 384/448 |
| 6,568,854 B2 * | 5/2003 | Schleinitz .................... 384/448 |
| 2003/0147572 A1 * | 8/2003 | Message et al. ............. 384/448 |

FOREIGN PATENT DOCUMENTS

JP    JP9297151    11/1997

* cited by examiner

*Primary Examiner*—Thomas R Hannon
(74) *Attorney, Agent, or Firm*—Dotthavong, Mori & Steiner, P.C.

(57) ABSTRACT

A rotation sensor of a bearing with a rotation sensor comprises a sensor housing having a sensor and mounted on an outer race, and a sensor target ring having a detector sensed by the sensor and separated from an inner race, in which a setscrew is provided so as to be displaced to a first position between a through-hole formed in the sensor housing and a screw hole formed in the sensor target ring or a second position in which it is held in either one of recesses.

16 Claims, 4 Drawing Sheets

BEARING WITH ROTATION SENSOR AND METHOD OF INCORPORATING THE SAME TO ROTATING OBJECT

BACKGROUND OF THE INVENTION

1. Field of the Invention

The present invention relates to a bearing with a rotation sensor in which an optical or a magnetic rotation sensor is incorporated in a bearing and a method of incorporating the above to a rotating object.

2. Description of the Background Art

For example, there is a bearing with a rotation sensor in which a rotation sensor is mounted on a roller bearing to detect a rotation speed or a rotation direction. According to such bearing with the rotation sensor, as disclosed in Japanese Unexamined Patent Publication No. 9-297151, for example, a sensor is arranged at an outer race which is a fixed-side race and a sensor target ring is arranged at an inner race which is a rotation-side race. The sensor target ring comprises a detector at one end face of a flange, which comprises a region in which light is reflected and a region in which light is not reflected which are alternately arranged. A rotation sensor detects the rotation speed or the rotation direction by irradiating the detector with light from the sensor and sensing the reflected light from the detector.

According to the conventional optical bearing with the rotation sensor, the sensor housing comprising the sensor is mounted on the fixed-side race and the sensor target ring is incorporated in the rotation-side race. Therefore, when an outer peripheral surface of a rotation spindle engages with an inner peripheral surface of the rotation-side race to be fixed, when its engaging force is small, a skid is generated between the rotation spindle and the rotation-side race of the bearing comprising the sensor target ring during rotation. Especially, when the bearing with the rotation sensor is incorporated in an office machine such as a copying machine or a printer, engagement of a bearing could be loose and tolerance of size is increased. Thus, it is highly likely that the skid is generated. As a result, rotation displacement of the rotation spindle is not correctly measured and measurement cannot be taken with high precision.

As means for solving the above problem, a method in which the sensor target ring and the rotation-side race are separated and the sensor target ring is directly mounted on the rotation spindle is considered. Thus, even when a skid is generated between the rotation-side race and the rotation spindle, since relative displacement in the rotation direction is not generated between the rotation spindle and the sensor target ring, measurement can be taken with high precision without affecting the rotation detection precision of the rotation spindle.

However, when the sensor target ring and the rotation-side race are separated, it is necessary to handle the bearing and the sensor target ring separately when they are transported before the bearing is mounted on the rotation spindle.

SUMMARY OF THE INVENTION

It is an object of the present invention to provide a bearing with a rotation sensor in which an error in measuring the rotation due to a skid between a rotation-side race and a rotating object is prevented by separating a sensor target ring from the rotation-side race and connecting means for connecting a sensor housing to the sensor target ring, so that handleability is improved.

According to the present invention, a bearing with a rotation sensor comprises a bearing including a rotation-side race and a fixed-side race, and a rotation sensor detecting rotation of a rotating object on which the rotation-side race is mounted, in which the rotation sensor comprises a sensor housing having a sensor and mounted on the fixed-side race, a sensor target ring having a detector sensed by the sensor and separated from the rotation-side race, and connecting means provided so as to selectively change over a state in which the sensor housing and the sensor target ring are connected and a state in which they are disconnected. Thus, since the sensor housing and the sensor target ring are connected, the sensor target ring can be handled as an integral part with a bearing body when the bearing with the rotation sensor is transported and they are disconnected when the sensor target ring is mounted on the rotating object.

Preferably, the connecting means may comprise a fixed-side recess formed in the sensor housing, a rotation-side recess formed in the sensor target ring so as to be opposed to the fixed-side recess, and a connecting shaft provided such that it can be displaced to a first position between the fixed-side recess and the rotation-side recess, or a second position in which it is held in either one of the recesses.

Furthermore, the fixed-side recess may be a through-hole penetrating the sensor housing, the rotation-side recess may be a screw hole, and the connecting shaft may be a setscrew to engage with the screw hole of the sensor target ring.

Preferably, the screw hole is a through-hole penetrating the sensor target ring, and the setscrew can be used as a setscrew for fixing the sensor target ring to the rotating object. Thus, the rotating object and the sensor target ring can be easily fixed. In addition, since the sensor target ring is directly mounted on the rotating object whose rotation is to be detected, by the setscrew, even when a skid is generated between the rotation-side race and the rotating object, relative displacement between the rotating object and the sensor target ring is not generated in the rotation direction, so that highly precise measurement can be implemented without affecting rotation detection precision of the rotating object.

Preferably, the fixed-side recess is a screw hole to engage with the setscrew. Thus, the sensor housing and the sensor target ring can be more surely connected.

Preferably, a length of the setscrew is shorter than a length of the screw hole of the sensor target ring. Thus, when the setscrew is screwed into the screw hole and held in it, the sensor housing and the sensor target ring can be separated.

Preferably, the sensor target ring is made of a resin. Thus, when the setscrew engages with the screw hole of the sensor target ring, since a screw thread is formed in the screw hole, it is not necessary to previously provide a screw thread in the screw hole in manufacturing steps, so that the number of manufacturing steps can be reduced.

Another aspect of the present invention provides a method of incorporating a bearing with a rotation sensor into a rotating object. The bearing with the rotation sensor comprises a sensor housing having a sensor and mounted on a fixed-side race of the bearing and a sensor target ring having a detector sensed by the sensor and separated from a rotation-side race of the bearing. The sensor housing and the sensor target ring are connected by connecting means before the bearing with the rotation sensor is incorporated into the rotating object. The sensor target ring is separated from the sensor housing by disconnecting the connecting means and the sensor target ring is fixed to the rotating object when the bearing with the rotation sensor is incorporated into the rotating object.

Preferably, the connecting means comprises a connecting shaft to connect the sensor target ring to the sensor housing, and the connecting shaft is used as fixing means for fixing the sensor target ring to the rotating object when the bearing is incorporated into the rotating object.

Preferably, each of the sensor housing and the sensor target ring has a through-hole to which the connecting shaft is inserted, the connecting shaft is positioned at a boundary between the through-hole of the sensor housing and the through-hole of the sensor target ring to connect the sensor housing and the sensor target ring before the bearing with the rotation sensor is incorporated, and the connecting shaft is positioned in the through-hole of the sensor target ring to separate the sensor target ring from the sensor housing and an end of the connecting shaft abuts on a surface of the rotating object to fix the sensor target ring to the rotating object when the bearing with the rotation sensor is incorporated into the rotating object.

The bearing with the rotation sensor according to the present invention comprises the connecting means provided such that the state in which the sensor target ring to be directly mounted on the rotating object is connected to the sensor housing and a state in which they are disconnected can be selectively changed over. Thus, since the sensor target ring can be handled as an integral part with the bearing body during transportation, the bearing with the rotation sensor can be easily handled. In addition, the sensor target ring can be separated from the sensor housing when they are activated.

According to the method of incorporating the bearing with the rotation sensor into the rotating object in the present invention, the sensor housing and the sensor target ring can be connected before the bearing with the rotation sensor is incorporated into the rotating object, so that the bearing with the rotation sensor can be easily handled. In addition, when the bearing with the rotation sensor is incorporated into the rotating object, the sensor target ring and the sensor housing are disconnected and the sensor target ring can be fixedly mounted on the rotating object.

DESCRIPTION OF THE PREFERRED EMBODIMENTS

Figure 1:
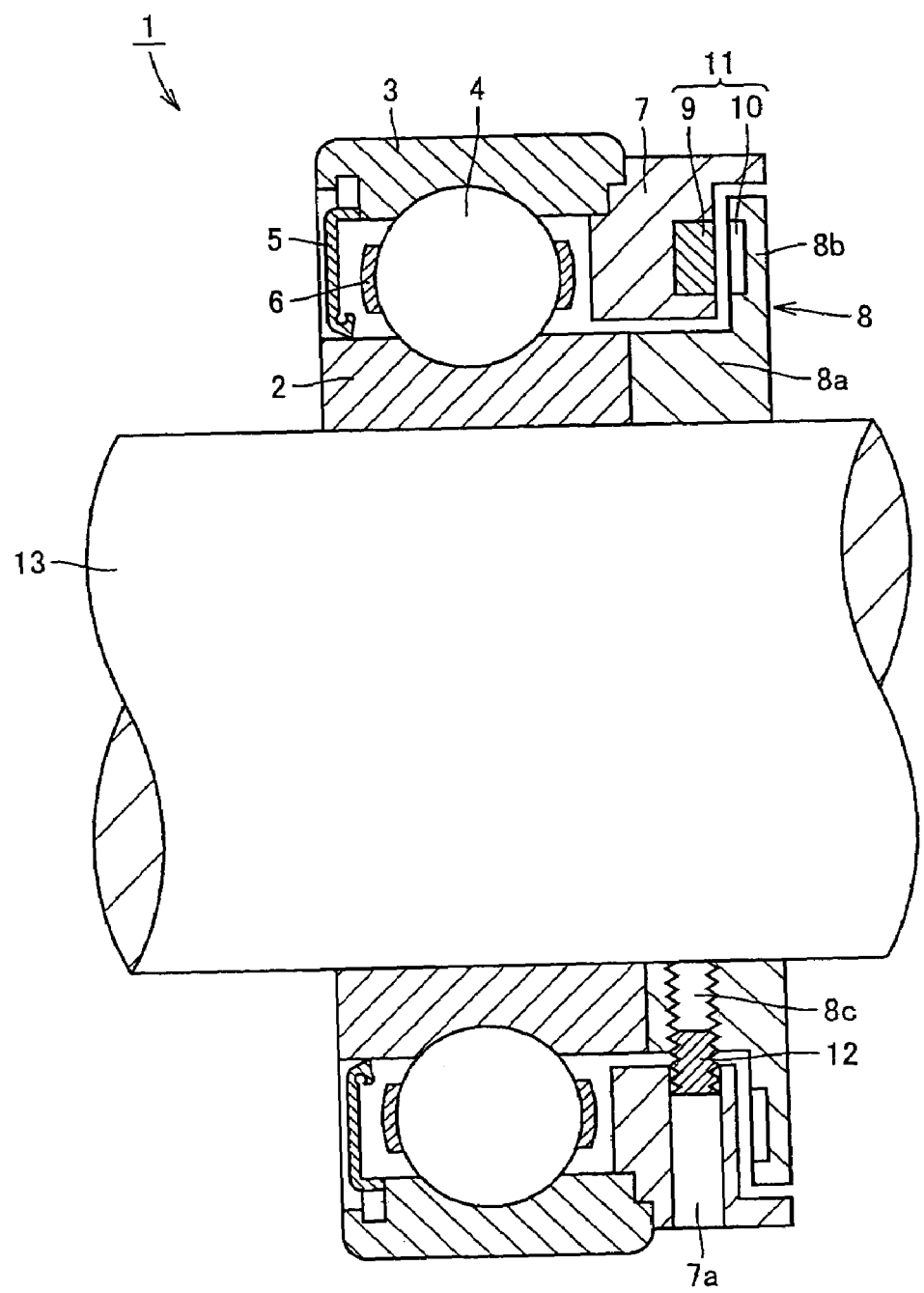
FIG. 1 is a schematic sectional view showing a bearing with a rotation sensor according to one embodiment of the present invention, in which a sensor housing and a sensor target ring are connected to each other.

FIG. 1 is a sectional view showing an embodiment of the present invention, in which a roller bearing 1 comprises an inner race 2 and an outer race 3 and a rolling element 4 arranged between the inner race 2 and the outer race 3. The rolling element 4 is held by a retainer 6 and equally spaced. One end of a bearing space between the inner race 2 and the outer race 3 is sealed by a seal 5 and a sensor housing 7 is arranged at the other end. Although the inner race 2 constitutes a rotation-side race and the outer race 3 constitutes a fixed-side race in this example, the inner race 2 may be the fixed-side race and the outer race 3 may be the rotation-side race.

The inner race 2 is mounted on an outer peripheral surface of a rotation spindle 13 as a rotating object and a sensor target ring 8 is also mounted on it separately. The sensor target ring 8 comprises a mount part 8a whose inner peripheral surface has contact with the outer peripheral surface of the rotation spindle 13 and a flange 8b extending from the outer peripheral surface in a diameter direction. A detector 10 comprising a region in which light is reflected and a region in which light is not reflected is formed on one end surface of the flange 8b.

The sensor housing 7 engages with an inner diameter surface of the outer race 3. A sensor 9 is arranged in the sensor housing 7 so as to be opposed to the detector 10. A rotation sensor 11 comprises the sensor 9 and the detector 10.

A screw hole 8c as a rotation-side recess is formed from an outer peripheral surface to an inner peripheral surface of the mount part 8a in the sensor target ring 8. A through-hole 7a connected to the screw hole 8c of the sensor target ring 8 is provided in the sensor housing 7 as a fixed-side recess.

Since the sensor target ring 8 does not engage with the inner race 2, it is separated from the bearing 1 with the rotation sensor before mounted on the rotation spindle 13. Thus, a setscrew 12 as a connecting shaft is inserted into the screw hole 8c and the through-hole 7a and held between the sensor housing 7 and the sensor target ring 8, so that both are connected. Thus, the sensor target ring 8 can be integrated with the bearing 1 with the rotation sensor. As a result, since a screw thread is not formed in the inner peripheral surface of the through-hole 7a of the sensor housing 7, they are not completely fixed. However, since the sensor target ring 8 is not separated from the bearing 1 with the rotation sensor during transportation, they can be easily handled.

Figure 2:
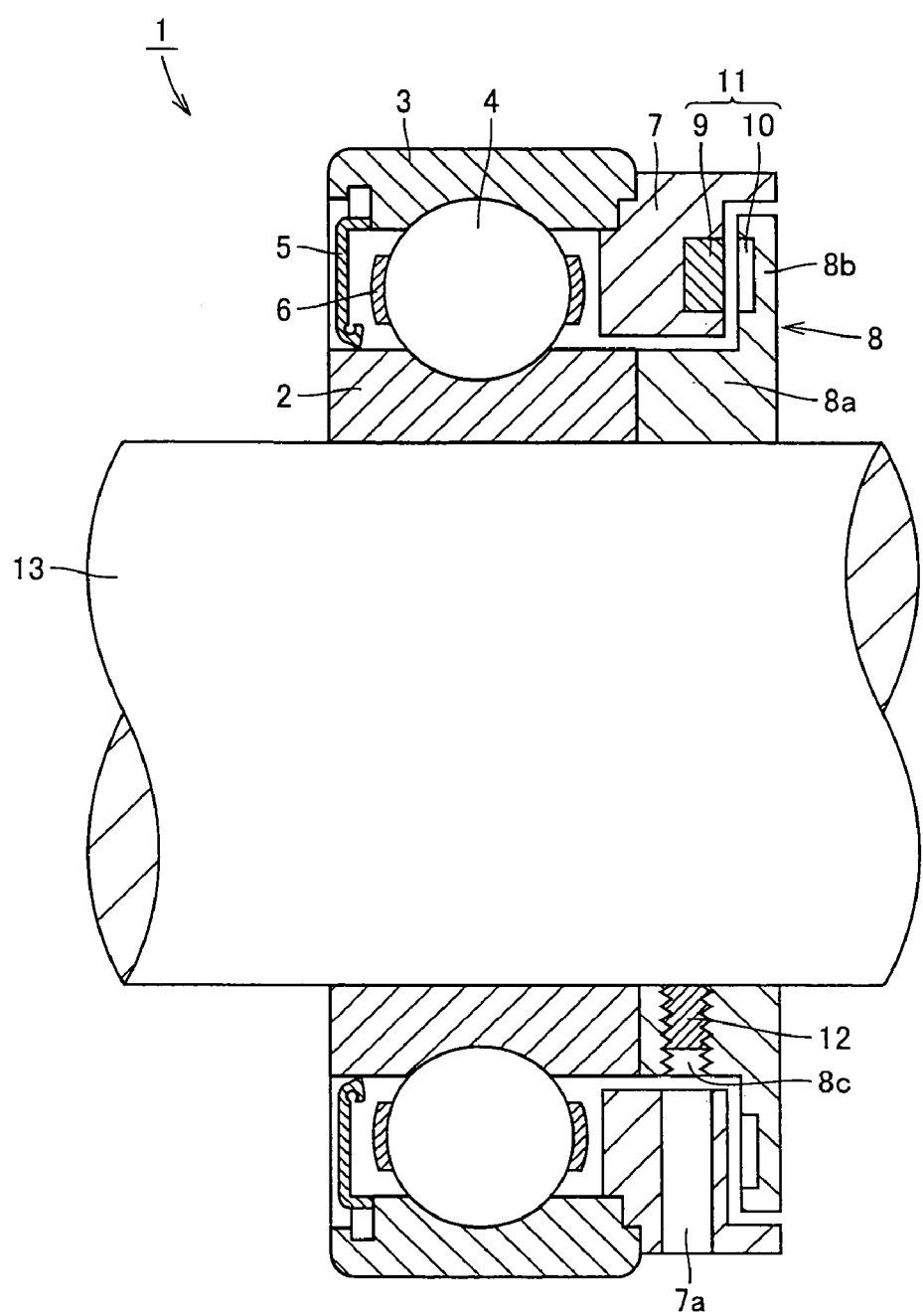
FIG. 2 is a schematic sectional view showing the bearing with the rotation sensor according to one embodiment of the present invention, in which the sensor housing and the sensor target ring are disconnected and the sensor target ring is fixed to a rotating object.

FIG. 2 is a sectional view showing a state after the bearing 1 with the rotation sensor is mounted on the rotation spindle 13. When the sensor target ring 8 is mounted on the rotation spindle 13, it is necessary to disconnect the sensor housing 7 and the sensor target ring 8. In this case, the setscrew 12 which connected the sensor housing 7 to the sensor target ring 8 is screwed into the screw hole 8c to be held there.

Furthermore, when the setscrew 12 is screwed in until it abuts on the rotation spindle 13, the sensor target ring 8 can be directly fixed to the rotation spindle 13. Thus, the sensor target ring 8 can be easily fixed to the rotation spindle 13.

As described above, since the sensor target ring 8 is directly mounted on the rotation spindle 13 whose rotation is to be detected, by the setscrew 12, even when a skid is generated between the inner race 2 and the rotation spindle 13, relative displacement in the rotation direction is not generated between the rotation spindle 13 and the sensor target ring 8, so that measurement can be implemented with high precision without affecting rotation detection precision of the rotation spindle 13.

In addition, a length of the setscrew 12 is made so as to be shorter than a length of the screw hole 8c. Thus, when the setscrew 12 is screwed into the screw hole 8c and held therein, the sensor housing 7 and the sensor target ring 8 can be separated.

Figure 3:
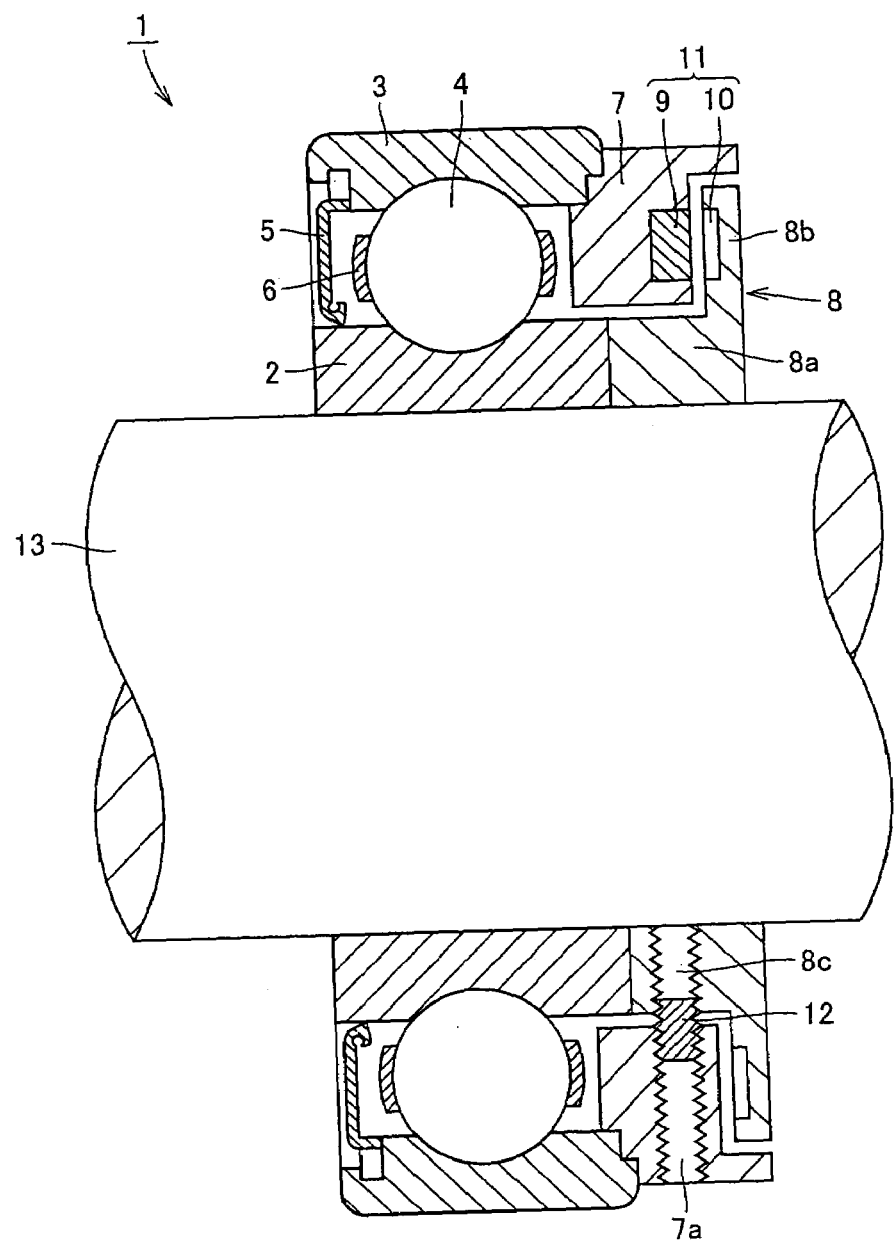
FIG. 3 is a schematic sectional view showing a bearing with rotation sensor according to another embodiment of the present invention, in which a sensor housing and a sensor target ring are connected.

FIG. 3 is a sectional view showing a bearing 1 with a rotation sensor according to another embodiment of the present invention. According to this embodiment, screw threads are formed in an inner peripheral surface of a through-hole 7a in a sensor housing 7 and other constitutions are the same as those in FIG. 1. When the bearing 1 with the rotation sensor is transported, a setscrew 12 engages with a screw hole 8c of a sensor target ring 8 and the through-hole 7a in the sensor housing 7, so that the sensor housing 7 and the sensor target ring 8 can be more surely fixed to each other.

Figure 4:
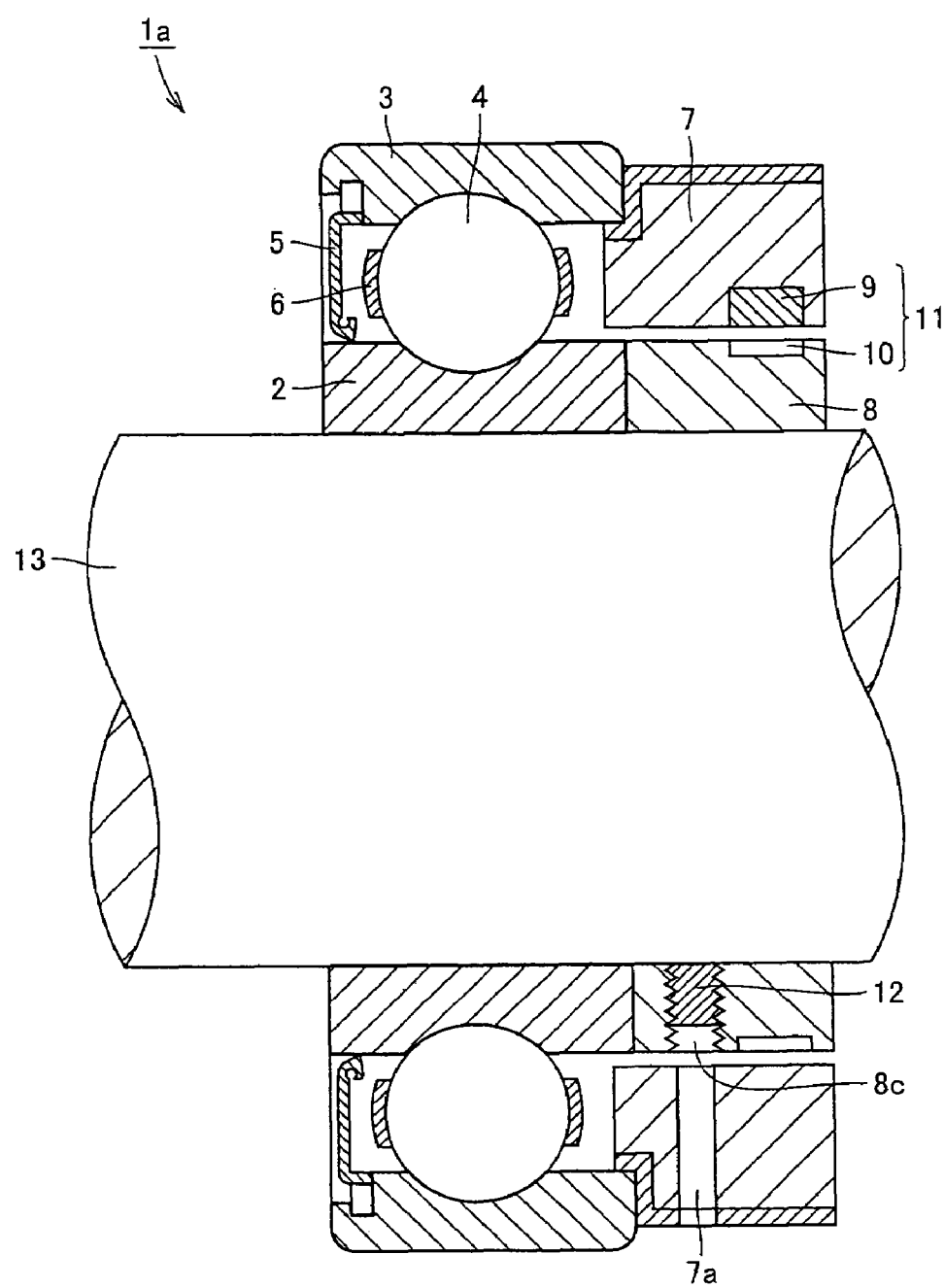
FIG. 4 is a schematic view in which a sensor and a detector of the sensor target ring are arranged oppositely in a radial direction of a bearing.

FIG. 4 is a sectional view showing a bearing with a rotation sensor 1a according to still another embodiment of the present invention. According to this embodiment, a detector 10 is provided on an outer peripheral surface of a mount part 8a, and a sensor 9 mounted on a sensor housing 7 and the detector 10 are opposed to each other in a radial direction of a bearing.

According to the above embodiments, the sensor target ring 8 may be made of a resin. Thus, when the setscrew 12 engages with the sensor target ring 8, since the screw threads are formed inside the screw hole 8c at that time, it is not necessary to previously provide screw threads in the screw hole 8c in manufacturing steps and the number of manufacturing steps can be reduced.

Although only one sensor 9 is provided in the sensor housing 7 in the above embodiments, when the sensors 9 are provided at a plurality of positions, not only the rotation speed but also a rotation direction can be detected and measurement can be implemented with higher precision.

Although the rotation of the rotation spindle 13 is detected by detecting reflected light of the detector 10 using the sensor 9 in the above embodiments shown in FIGS. 1 to 3, the rotation of the rotation spindle 13 may be detected by arranging regularly spaced slits (not shown) in the flange 8b as a detector, providing a light source opposed to the sensor 9 with respect to the slits and detecting light outputted from the light source through the slits by the sensor 9.

In addition, a ball or a roller may be used as the rolling element 4. Furthermore, the present invention may be applied to not only the roller bearing but also a sliding bearing and an air bearing.

Still furthermore, although the optical rotation sensor is used in the above embodiments shown in FIGS. 1 to 4, the present invention is not limited to this and a magnetic sensor may be used.

In addition, although the through-hole 7a, the screw hole 8c and the setscrew 12 engaging with the screw hole 8c serve as both connecting means for connecting the sensor housing 7 and the sensor target ring 8 and fixing means for fixing the sensor target ring 8 to the rotation spindle 13 in the above embodiments, both means may be separately provided.

In this case, the screw hole 8c as the means for connecting the sensor housing 7 and the sensor target ring 8 may not penetrate the inner peripheral surface of the mount part 8a. In addition, the screw hole 8c and the through-hole 7a may be oppositely provided in an axial direction of the bearing 1 with the rotation sensor.

Still furthermore, they may be connected such that the screw hole 8c has the same diameter as that of the through-hole 7a and a connecting shaft is inserted between the screw hole 8c and the through-hole 7a, or such that a stopper to connect the sensor housing 7 and the sensor target ring 8 is provided and the sensor housing 7 and the sensor target ring 8 are connected by the stopper during transportation and they may be disconnected when they are activated.

In addition, as the fixing means for fixing the sensor target ring 8 to the rotation spindle 13, the sensor target ring 8 may engage with the rotation spindle 13 or a key groove may be provided in the inner peripheral surface of the mount part 8a of the sensor target ring 8 and in the outer peripheral surface of the rotation spindle 13 to engage with each other.

Although the embodiments of the present invention have been described with reference to the drawings in the above, the present invention is not limited to the above illustrated embodiments. Various kinds of modifications and variations may be added to the illustrated embodiments within the same or equal scope of the present invention.

The present invention is advantageously applied to the bearing with the rotation sensor to be mounted on the rotating object to detect the rotation of the rotating object.

What is claimed is:

1. A bearing with a rotation sensor comprising a bearing including a rotation-side race and a fixed-side race, and a rotation sensor detecting rotation of a rotating object on which said rotation-side race is mounted, characterized in that wherein said rotation sensor comprises:
a sensor housing having a sensor and mounted on said fixed-side race;
a sensor target ring having a detector sensed by said sensor and separated from said rotation-side race; and
connecting means provided so as to selectively change over a state in which said sensor housing and said sensor target ring are connected and a state in which they are disconnected,
wherein said connecting means comprises:
a fixed-side recess formed in the sensor housing;
a rotation-side recess formed in the sensor target ring so as to be opposed to said fixed-side recess; and
a connecting shaft provided such that it can be displaced to a first position between said fixed-side recess and said rotation-side recess, or a second position in which it is held in either one of said recesses.

2. The bearing with the rotation sensor according to claim 1, wherein said fixed-side recess is a through-hole penetrating said sensor housing, said rotation-side recess is a screw hole, and said connecting shaft is a setscrew to engage with the screw hole of said sensor target ring.

3. The bearing with the rotation sensor according to claim 2, wherein said screw hole is a through-hole penetrating said sensor target ring, and said setscrew fixes said sensor target ring to said rotating object.

4. The bearing with the rotation sensor according to claim 2, wherein said fixed-side recess is a screw hole to engage with said setscrew.

5. The bearing with the rotation sensor according to claim 2, wherein a length of said setscrew is shorter than a length of the screw hole of said sensor target ring.

6. The bearing with the rotation sensor according to claim 1, wherein said sensor target ring is made of a resin.

7. A method of incorporating a bearing with a rotation sensor comprising a sensor housing having a sensor and mounted on a fixed-side race of the bearing and a sensor target ring having a detector sensed by said sensor and separated from a rotation-side race of the bearing, into a rotating object, said method characterized by comprising:
a step of connecting said sensor housing and said sensor target ring by connecting means before the bearing with the rotation sensor is incorporated into the rotating object; and
a step of separating said sensor target ring from the sensor housing by disconnecting said connecting means and fixing said sensor target ring to said rotating object when said bearing with the rotation sensor is incorporated into the rotating object,
wherein said connecting means comprises a connecting shaft to connect said sensor target ring to said sensor housing, and said connecting shaft is used as fixing means for fixing said sensor target ring to said rotating object when the bearing is incorporated into the rotating object.

8. The method of incorporating the bearing with the rotation sensor according to claim 7, wherein each of said sensor housing and said sensor target ring has a through-hole to which said connecting shaft is inserted, said connecting shaft is positioned at a boundary between the through-hole of said sensor housing and the through-hole of said sensor target ring to connect said sensor housing and said sensor target ring before the bearing with the rotation sensor is incorporated, and said connecting shaft is positioned in the through-hole of said sensor target ring to separate said sensor target ring from said sensor housing and an end of said connecting shaft abuts on a surface of said rotating object to fix said sensor target ring to said rotating object when the bearing with the rotation sensor is incorporated into said rotating object.

9. A bearing comprising:
    a fixed-side race;
    a rotation-side race configured to be mounted to a rotating object; and
    a rotation sensor configured to detect rotation of the rotating object on which said rotation-side race is mounted, wherein said rotation sensor comprises:
        a sensor target ring having a detector, said sensor target ring being separated from said rotation-side race;
        a sensor housing having a sensor configured to sense said detector, said sensor housing being mounted on said fixed-side race; and
        a connecting device configured to selectively connect and disconnect said sensor housing and said sensor target ring,
    wherein said connecting device is further configured to selectively connect and disconnect said sensor target ring to the rotating object.

10. The bearing according to claim 9, wherein said connecting device includes a connecting shaft that is configured to selectively extend through said sensor housing and said sensor target ring.

11. The bearing according to claim 9, wherein said connecting device includes:
    a fixed-side recess formed in said sensor housing;
    a rotation-side recess formed in said sensor target ring so as to be opposed to said fixed-side recess; and
    a connecting shaft configured to be selectively displaced to a first position between said fixed-side recess and said rotation-side recess, or a second position in which said connecting shaft is held in either one of said recesses.

12. The bearing according to claim 11, wherein said fixed-side recess is a through-hole penetrating said sensor housing, said rotation-side recess is a screw hole, and said connecting shaft is a setscrew to engage with said screw hole of said sensor target ring.

13. The bearing according to claim 12, wherein said screw hole is a through-hole penetrating said sensor target ring, and said setscrew fixes said sensor target ring to said rotating object.

14. The bearing according to claim 12, wherein said fixed-side recess is a screw hole to engage with said setscrew.

15. The bearing according to claim 12, wherein a length of said setscrew is shorter than a length of the screw hole of said sensor target ring.

16. The bearing according to claim 9, wherein said sensor target ring is made of a resin.

* * * * *